Dec. 29, 1925.

J. L. KIMBALL 1,567,995

PRESSURE REGULATOR

Filed Jan. 31, 1925
2 Sheets-Sheet 1

INVENTOR.
James L Kimball

Patented Dec. 29, 1925.

1,567,995

UNITED STATES PATENT OFFICE.

JAMES LEWIS KIMBALL, OF SALEM, MASSACHUSETTS, ASSIGNOR TO RUGGLES-KLINGEMANN MFG. CO., OF SALEM, MASSACHUSETTS, A CORPORATION OF MASSACHUSETTS.

PRESSURE REGULATOR.

Application filed January 31, 1925. Serial No. 6,009.

*To all whom it may concern:*

Be it known that I, JAMES LEWIS KIMBALL, a citizen of the United States, residing at 9 Dearborn St., Salem, in the county of Essex and State of Massachusetts, have invented certain new and useful Improvements in Pressure Regulators, of which the following is a specification.

This invention relates to pressure control apparatus, and from a more specific aspect, the invention relates to motor operated valves and means to control such valves from variations in pressure, and in such a manner as to prevent hunting action.

To attain this object, I provide a valve in which the orifice opening through the valve can be manually adjusted independently of the adjustment of the valve by the motor, the purpose of which is to prevent a too sudden change in the pressure to be controlled, thereby avoiding over travel and hunting action. This, in itself, would not entirely prevent hunting action, and it is found necessary to provide the regulator with certain compensating effect to compensate for the time lag between the operation of the motor and the transmission of the change in pressure to the pressure sensitive device.

The compensating attachment referred to consists of a follow-up arrangement whereby the motor controlling switch is controlled jointly by the pressure sensitive device and by the operation of the motor. The increase travel of the pressure sensitive device necessary to effect a complete opening and closing of the valve due to the follow-up switch is such as to give the regulating apparatus a certain pressure operating range with a certain number of cut-off points and by means of the adjustable valve the regulator when properly adjusted becomes dead beat at each cut-off point, or, in other words, the pressure acting on the pressure sensitive device will be in conformity to its pressure setting at each of these cut-off points and hunting action or over travel is therefore avoided.

A clear conception of my invention may be had by reference to the drawings accompanying and forming a part of the specifications in which like reference characters designate the same or similar parts in the several views.

Figure 1:
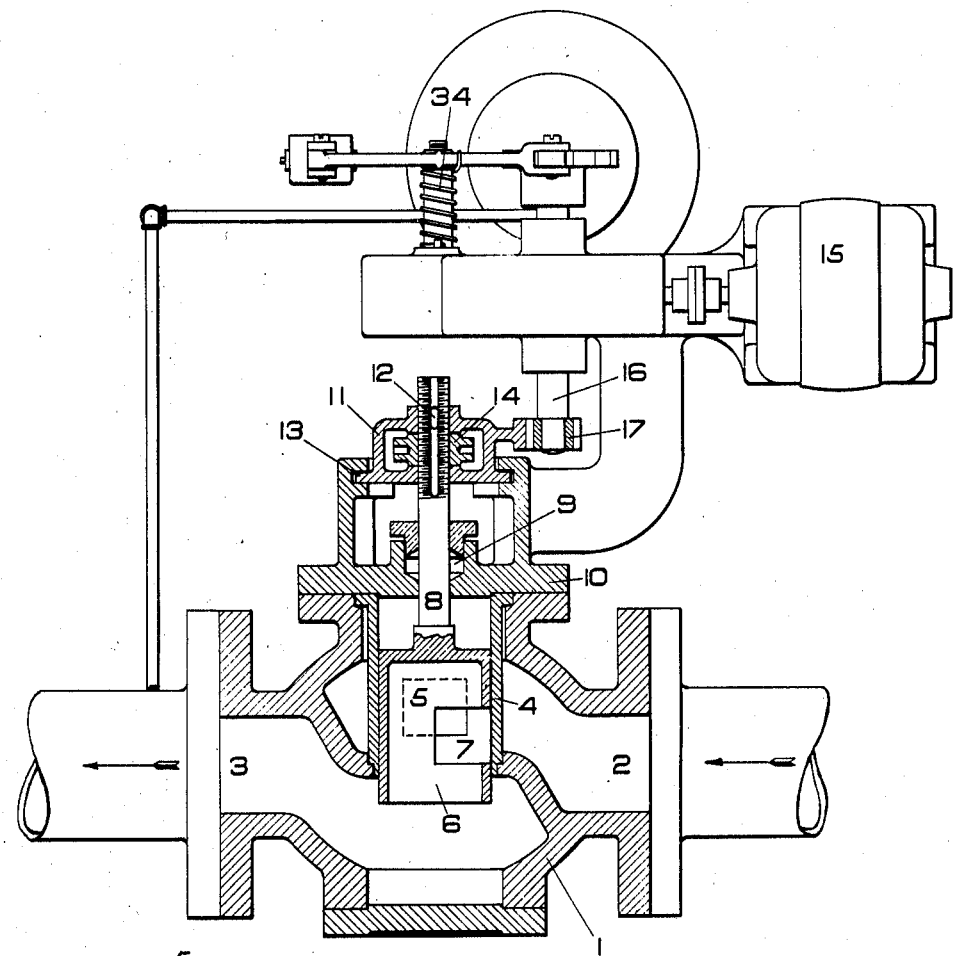
Fig. 1 shows a plan view of my invention, the valve being shown in section.

Referring to Fig. 1, (1) represents a valve casing having inlet (2) and outlet (3). A valve cage (4) has a plurality of circumferentially disposed ports (5) for the passage of fluid pressure from the inlet to the outlet of said valve. A valve (6) is slidably and rotatably mounted in the valve cage (4) and has circumferentially disposed ports (7) arranged to register more or less with the ports in the valve cage. A valve stem (8) is rigidly connected with the valve (6) and extends through stuffing box (9) in valve bonnet (10). An actuating gear quadrant (11) is secured to the upper end of the valve stem by key (12) which permits the valve (6) to be rotated by the rotation of the gear quadrant (11). The bonnet (10) has a projection having guide ways (13) formed concentric to receive an extension of the gear quadrant. An adjusting nut (14) is threadably mounted on the valve stem and is secured against lateral motion by being held in the yoked end of the gear quadrant. The gear quadrant has an opening at either side to permit the adjustment of the nut 14, by means of a pin or spanner wrench being inserted in radial sockets. Screw nut (14) may be rotatably adjusted to slidably adjust the valve (6) to close off more or less of the port openings registering between the valve (6) and valve cage (4) or, the gear quadrant can be moved through a given arc to rotate the stem (8) and the valve (6) to vary the amount of port area registering between the valve (6) and valve cage (4).

Figure 2:
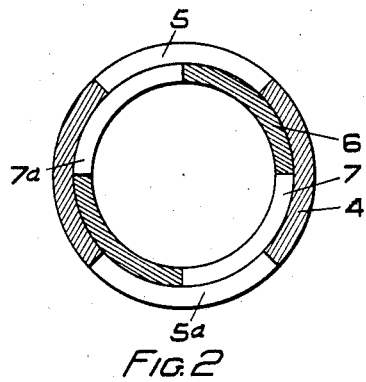
Fig. 2 is a cross section through the valve (6) and valve cage (4) showing arrangement of delivery ports.

Referring to Fig. 2, it will be noted that the inlet ports (5) in the valve cage (4) are arranged diametrically opposite one another in an annular chamber between the inlet (2) and outlet (3) of the valve casing. This places the valve (6) in a balanced condition as to pressure and this balanced condition is maintained throughout its entire opening and closing movement. An electric motor (15) is arranged to operate shaft (16) through suitable gear reduction. This shaft (16) has pinion gear (17) which engages with the gear quadrant (11) and is arranged to rotate the valve (6) through an angle 90 degs. between the limits of travel of the motor (15).

Figure 3:
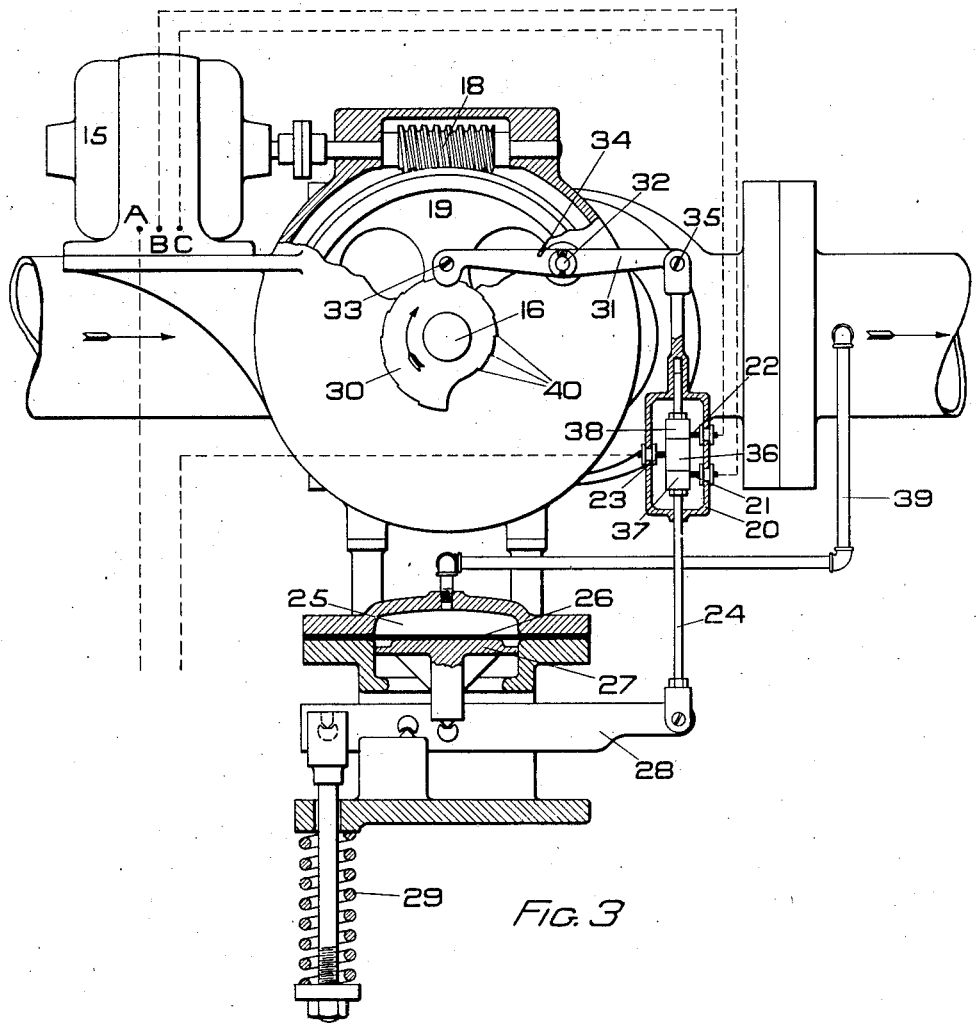
Fig. 3 is an elevation partially in vertical cross section through motor operating gear, pilot switch and pressure responsive device.

Referring now to Fig. 3, we will explain the method of controlling this motor from pressure variation and limiting its operation to that required to open and close the valve ports. The motor (15) drives the shaft (16) by means of worm (18) and worm gear (19) the latter being rigidly secured to the shaft (16). The operation of the motor and its direction of rotation is controlled by switch (20). The switch is shown in an open circuit position. The contact brushes (21) and (22) resting on insulating material while contact brush (23) rests on a conducting material. It will be seen that when this switch is moved upward by stem (24) that the current will flow from (23) to (22) causing the motor to operate in one direction, and if the switch is moved downward by stem (24) the current will flow from (23) to (21) causing the motor to operate in the opposite direction. The pressure responsive device referred to comprises a pressure chamber (25) a flexible diaphragm (26) pressure cap (27) a fulcrumed lever (28) and pressure counteracting spring (29). It will be noted that the motor controlling switch is controlled jointly by the pressure responsive device and by the operation of the motor. This is accomplished by means of a cam (30) mounted on shaft (16). A rocker arm (31) is pivoted to the gear casing at (32). Its left hand end has a roll (33) which is held in engagement with cam (30) by means of spring (34). The right hand end of rocker arm is connected to the body portion of switch (20) at point (35) on the rocker arm. The contacting portion of this switch (36) and its two insulating portions (37) and (38) are rigidly mounted to stem (24). The contacting member (36) being insulated from the stem. These parts are slideably mounted in relation to the body of switch and are arranged to be controlled from arm (28) of the pressure responsive device while the body of the switch is controlled from the cam (30) by means of rocker arm (31). It will be understood that the brushes (21), (22) and (23) are electrically insulated from the body of the switch (20) and are held in engagement with the sliding portion of the switch.

The object of the apparatus is to control pressure. The drawing indicates its application as a reducing valve, although it should be understood that it may be used to control steam driven pumps. The valve, in such a case, would be installed in the steam supply pipe to the pump, and the pressure device connected with the delivery or discharge pressure. Or, it may be used for the control of steam driven fan engines for regulating air supply to boiler furnaces, in which case, the pressure responsive device would be connected to the boiler pressure.

Explaining its operation as a reducing valve. Fluid pressure flows through valve in the direction indicated by the arrows. A connecting pipe (39) connects the low or reduced pressure side of the valve with the pressure chamber (25). When the pressure in this chamber reaches the desired amount, for which spring (29) is adjusted, it forces arm (28) downward which operates motor switch to supply current to motor terminals (A) and (B). This operates motor in the direction to close the valve ports. The operation of the motor rotates the cam (30) in the direction indicated by the arrow. It will be noted that this cam (30) has a stepped face with a plurality of steps (40). The motor continues to operate until the roll (33) reaches a higher stepped position on the cam when the rocker arm (31) is moved to lower the body of the switch and bring the contacting brushes back to neutral or an open circuit position. The motor is now stopped to await a further variation in pressure acting on the pressure responsive device before effecting a further operation of the motor and valve. Assuming that this operation is not sufficient to check the pressure, then the motor moves the valve to its next cut-off position and so on. If there is a decrease in pressure below normal acting on the pressure responsive device, then the spring (29) will overcome the pressure in chamber (25) and the sliding portion of the switch will be moved upward thereby establishing connections with motor terminals (A) and (C) which will operate the motor in the opposite direction, thereby opening the valve which would turn cam (30) in the opposite direction to that indicated by the arrow and as the roll reached a lower stepped position on the cam the circuit would be again broken and the motor would be stopped.

As explained in the statement of invention, the object of the invention is to prevent hunting action, and this could not be successfully accomplished unless the reduced pressure acting on the flexible diaphragm was consistent with the pressure setting of the pressure responsive device at each cut-off point. It will be understood that if the orifice opening through the valve was too large then a unit of movement from one stepped position to the next succeeding position would produce too sudden a change in pressure on the low pressure side of the valve and this would lead to hunting action. This means that the orifice opening through the valve ports must be adjustable so the supply of fluid pressure at maximum operation of the motor in opening the valve will be proportionate to the maximum demand and no more. As an illustration, assume that the cam is provided with 10 steps and that on the operation of the motor to the third step, we supply maximum fluid pressure demand, then it is evident that we have seven additional steps which will not be effective and that we are effecting too abrupt changes in the pressure. If we had no means for adjustment of the orifice or port openings of the valve independent of the adjustment by the motor, we would expect hunting action. In order to maintain a substantially constant pressure consistent with the pressure setting of the pressure responsive device at each cut-off point, I have provided means to adjust the valve independent of its adjustment by the motor. Referring to Fig. 1, a screw nut (14) is threadably mounted on valve stem (8). This nut being held in the yoked end of the gear quadrant (11). If the motor should show hunting action, then it is only necessary to turn screw nut in the direction to close off more or less of the port area registering between the valve and the valve cage. In this way the motor will rotate the valve to a wider port position to make up for the loss of port area. The same amount of fluid pressure will be flowing through the valve, but a unit of movement from one step to the next step position will not produce so sudden a change in the reduced pressure. Thus, it will be seen that this mechanism is capable of adjustment to minimize the number of operations of the motor instead of operating in small increments of travel of the motor as would be the case if our follow-up compensating were not provided with steps. We provide fewer but definite cut-off points so as to minimize the number of operations of starting and stopping the motor, but in doing this we must have an adjustable valve that can be manually adjusted to prevent the motor over travelling. The foregoing construction is presented for the purpose of illustrating the broad principles of invention, and it will be understood that the invention is not to be restricted by reason of the specific application disclosed, nor otherwise than by the claims.

What I claim as my invention and desire to secure by Letters Patent, is:—

1. In a pressure regulator comprising a valve for controlling the pressure, an electric motor and means connecting the motor with the valve for effecting operation of the valve, a supply circuit for said motor, a switch in said supply circuit, for controlling the operation of the motor and its direction of rotation, a pressure responsive device for operating said switch to operate the motor, and a cam member operated by the motor for rendering said switch inoperative for operating the motor at a plurality of points between the limits of operation of said valve and to await a further variation in pressure acting on the pressure sensitive device for a farther operation of the motor.

2. In a pressure regulator, a valve for controlling the pressure, comprising a valve casing having an inlet and outlet, a passage between the inlet and the outlet, a valve in said passage, said valve being adapted to be either reciprocated or rotated to control the flow of fluid pressure from the inlet to the outlet of said valve, an electrically reversible motor for rotating said valve, a supply circuit for said motor, a switch in said supply circuit, said switch being adapted to control the operation of said motor and its direction of rotation, a pressure responsive device for operating said switch to control the operation of said motor, and a cam member operated by said motor and arranged to render said switch inoperative for operating the motor at a plurality of intermediate points between the limits of operation of the valve and means to reciprocate said valve to control the flow of fluid pressure from the inlet to the outlet without limiting the degree of operation of the motor.

3. In a pressure regulator comprising a valve for controlling the pressure, and electric motor for operating the valve, a supply circuit for said motor, a switch in said circuit, said switch having an open circuit position and two closed circuit positions adapted to control the operation of the motor and its direction of rotation, a pressure responsive device for operating said switch to either of its closed circuit positions, and means operated by the motor for returning the switch to its open circuit position at a plurality of points between the limits of operation of the motor to cause a further variation of pressure acting on the pressure responsive device for a further operation of the motor, and means to adjust the orifice opening of said valve independent of the operation of said motor.

4. In a pressure regulator comprising a valve for controlling the pressure, an electric motor for operating the valve, a supply circuit for said motor, a switch in said circuit, said switch having an open circuit position and two closed circuit positions adapted to control the operation of the motor and its direction of rotation, a pressure responsive device for operating said switch to either of its closed circuit positions and a cam member operated by the motor for returning the switch to its open circuit position at a plurality of points between the limits of operation of the motor to cause a further variation in pressure acting on the pressure responsive device for the further operation of the motor, and means to manually adjust said valve to limit the flow of fluid pressure independent of the adjustment by the motor.

5. In a pressure regulator comprising a valve for controlling the pressure, an electric motor for operating the valve, a supply circuit for said motor, a switch in said supply circuit, said switch having an open circuit position and two closed circuit positions adapted to control the operation of the motor and its direction of rotation, a pressure responsive device for operating said switch to either of its closed circuit positions, and a stepped cam member operated by the motor for returning the switch to its open circuit position at a plurality of points between the limits of operation of the motor to cause a further variation in pressure acting on the pressure responsive device for a further operation of the motor.

6. In a pressure regulator comprising in combination a valve casing, having an inlet and outlet, a passage between the inlet and outlet, a valve in said passage, said valve being adapted to be either reciprocated or rotated to control the flow of fluid pressure from the inlet to the outlet, an electric motor for opening or closing said valve in one direction only, a supply circuit for said motor, a switch in said circuit, said switch having an open circuit position and two closed circuit positions adapted to control the operation of the motor and its direction of rotation, a pressure responsive device for operating said switch to either of its closed circuit positions, and a stepped cam member operated by the motor for returning the switch to its open circuit position at a plurality of points between the limits of operation of the motor to cause a further variation in pressure acting on the pressure responsive device for a further operation of the motor, and means to adjust said valve independent of the adjustment by said motor to prevent hunting action.

7. In a fluid pressure regulator comprising an electric motor and means operated by said motor for controlling the pressure, a switch for controlling the motor, said switch comprising of an element for supporting terminal connections for the motor circuit, and an element for contacting with said terminal connection to control the motor and its direction of rotation, a pressure device for operating the last named element to either of its closed circuit positions, and a cam member having a plurality of steps for operating the first named element to effect an open circuit position at predetermined points between the limits of operation of the motor, and requiring a further variation in pressure acting on the pressure device for a further operation of the motor.

8. In a fluid pressure regulator comprising an electric motor and means operated by said motor for controlling the pressure, a switch for controlling the motor, said switch comprising a switch box having terminal connection for the motor circuit, a contacting element having an open circuit position in relation to the terminal connections on the switch box, and two closed circuit positions in relation to said terminals, adapted to control the operation of the motor and its direction of rotation, a pressure responsive device for moving said contacting element to either of its closed circuit positions and a cam member operated by the motor for moving the switch box in the same direction to which the contacting element is being moved by the pressure device to return the switch to its open circuit position at a plurality of points between the limits of operation of the motor to cause a further variation in pressure acting on the pressure responsive device for a further operation of the motor.

9. In a fluid pressure regulator comprising an electric motor for adjusting the fluid pressure regulating means, means to manually adjust the fluid pressure regulating means independent of the adjustment by the motor, a switch for controlling the operation of the motor and its direction of rotation, a pressure device for operating the switch, a cam member operated by the motor having a plurality of steps and means operated by said cam for effecting the operation of said switch independent of the operation of the pressure device at a plurality of points between the limits of operations of the motor to stop said motor at each of said plurality of steps and to cause a further variation in pressure acting on the pressure device for a further operation of the motor.

10. In a fluid system a motor for controlling the conditions of the fluid in the system, a switch for controlling the motor, means controlled in accordance with the conditions of the fluid in the system for closing the switch, and a stepped cam operated by the motor for opening the switch at predetermined points between the limits of operation of the motor.

11. In a pressure system, a motor for controlling the pressure in the system, a supply circuit for said motor, a switch in said circuit means controlled by the pressure in the system for closing said switch, and a stepped cam, operated by the motor for opening the switch at pre-determined points between the limits of operation of the motor to effect a further variation of pressure in the system for a further operation of the motor.

12. In combination a motor, a supply circuit, for said motor, a controlling switch in said circuit, said switch comprising two elements, said elements having a relatively open circuit position and two relatively closed circuit positions, means to actuate one of said elements to either of the relatively closed circuit positions, and a stepped cam member operated by the motor for operating the other element to the relatively open circuit position at a plurality of points between the limits of operation of the motor.

13. In a fluid system, a valve for controlling the condition of the fluid in the system, a motor for controlling the valve, a switch for controlling the motor, means for selectively controlling said switch in accordance with the condition of the fluid in the system and by said motor to effect an incremental control of the valve, and means to adjust the valve to a degree corresponding to the degree of fluctuation of the condition of the fluid in the system without limiting the degree of operation of the motor.

14. In a fluid system, a valve for controlling the condition of the fluid in the system, a motor for controlling the valve, a switch for controlling the motor, said switch having an open circuit position and two closed circuit positions, a device responsive to the condition of the fluid in the system for selectively operating said switch to either of its closed circuit positions, and a compensating device operated by the motor for selectively operating said switch to its open circuit position to effect an incremental control of the valve, and means to manually adjust said valve to a degree corresponding to the degree of fluctuation of the condition of the fluid in the system without limiting the degree of operating of the motor.

15. In a pressure system, means for controlling the pressure in the system, an electrically reversible motor for adjusting the pressure controlling means, a supply circuit for said motor, a controlling switch in said supply circuit adapted to control the operation of the motor and its direction of rotation, a cam member operated by the motor co-operating with a pressure responsive device for operating the controlling switch, the construction and arrangement being such as to effect a step by step control of the pressure controlling means through a pre-determined degree of operation, and means to adjust the pressure controlling means without limiting the degree of operation of the motor to prevent hunting action.

JAMES LEWIS KIMBALL.